Feb. 2, 1926.
G. H. FISHER
1,571,253
WATER RECOOLING APPARATUS
Filed Oct. 18, 1923
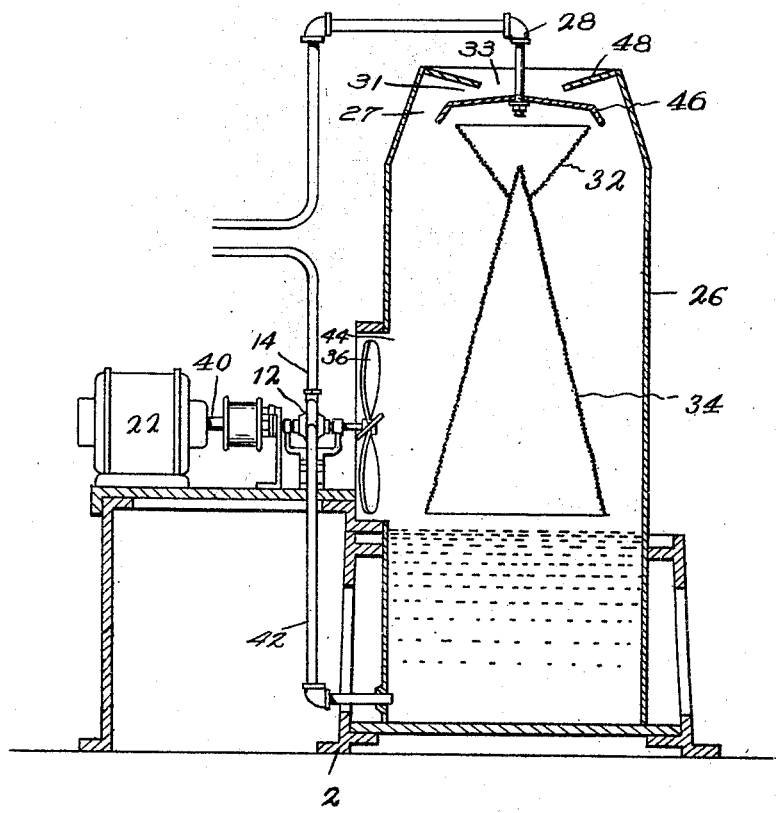
Witness:
Fred C. Rischer.
Inventor
George H. Fisher,
By F. G. Fischer,
Attorney.

Patented Feb. 2, 1926.

1,571,253

UNITED STATES PATENT OFFICE.

GEORGE HENRY FISHER, OF LEAVENWORTH, KANSAS.

WATER-RECOOLING APPARATUS.

Application filed October 18, 1923. Serial No. 669,277.

*To all whom it may concern:*

Be it known that I, GEORGE H. FISHER, a citizen of the United States, residing at Leavenworth, in the county of Leavenworth and State of Kansas, have invented certain new and useful Improvements in Water-Recooling Apparatus, of which the following is a specification.

My invention relates to an apparatus for recooling water which has taken up heat from other sources, and the present invention resides in a new and useful apparatus for recooling and conserving the water, so that it may be used for cooling purposes, such, for instance, as cooling the ammonia condenser and compressor of refrigerating machines.

Referring now to the different parts disclosed by the accompanying drawing which shows a vertical section of the invention, 26 designates a recooling tank or container mounted in a base 2. The cooling water is introduced into the upper portion of the tank 26 through a pipe 28 and on discharging from said pipe 28 impinges against a relatively short downwardly converging screen 32 and a long downwardly diverging screen 34, which latter screen depends from the former. The screens 32 and 34 reduce the water to small particles which are acted upon by an air blast created by a fan 36 fixedly mounted upon the shaft 40 of a motor 22 mounted on the base 2. The air blast delivered by the fan 36 cooperates with the screens 32 and 34 in reducing the water to fine particles and spray as it falls to the bottom of the tank 26. The air blast also reduces the temperature of the water, so that it will prove efficient for cooling purposes. When the motor 22 is in operation the recooled water in the tank 26 is drawn by a pump 12, driven by the shaft 40, through a suction pipe 42 and circulated through the apparatus to be cooled and then forced back to the recooling system through the pipe 28.

The fan 36 is arranged in an opening 44 at one side of the tank 26 and the air current created by said fan 36 is caused to spread throughout the tank 26 by baffles 46 and 48 at the upper portion of said tank 26. The baffle 46 is suspended from the pipe 28 over the mouth of the upper screen 32 and is of greater width than the latter, but of less width than the interior of the tank 26 to leave an intervening passageway 27 through which the air current may escape.

The baffle 48 extends inwardly and downwardly from the upper margin of the tank 26 and overlaps the baffle 46, above which it is spaced to leave an intervening passageway 31 through which the air may escape to atmosphere through an opening 33. By arranging the baffles 46 and 48 as shown and described it is apparent that a tortuous path is formed which causes the air current in its escape from the tank 26 to impinge against and thereby deposit entrained moisture upon said baffles from which it drips into the lower portion of the tank 26, so that there will be little or no loss of moisture.

The upwardly diverging screen 32 coacts with the screen 34 in dividing the water discharge from the pipe 28 into spray, as above pointed out, and also coacts with the baffles 46 and 48 in preventing the water from being blown out of the top of the tank by the air blast created by the fan 36.

From the foregoing description it will be understood that by recooling and collecting the cooling water in the tank 26 that a supply of water is insured for cooling purposes and that more or less complicated mechanism for insuring a supply of water to the cooling apparatus is eliminated as this function is reliably performed by the pump 12. While I have shown and described the preferred embodiment of the invention, I reserve the right to make such changes as properly fall within the spirit and scope of the invention as claimed.

Having thus described my invention, what I claim and desire to secure by Letters Patent, is:

1. A water recooling apparatus consisting of a container, a short upwardly diverging open mesh screen at the upper portion of said container, and an elongated open mesh screen arranged within the container and projecting into and depending from said short screen.

2. A water recooling apparatus consisting of a tank, a screen at the upper portion of said tank, a second screen arranged within the tank and below the first screen, means for creating and directing a blast of air through said screens, a baffle arranged above the first screen, and a second baffle extending inwardly and downwardly from the upper margin of the tank and spaced above the first baffle to leave an intervening passageway.

In testimony whereof I affix my signature.

GEORGE HENRY FISHER.